3,352,800
POROUS SYNTHETIC ION EXCHANGE
CATALYSTS AND PREPARATION
THEREOF
Robert B. Smith, Pitman, and William E. Garwood, Haddonfield, N.J., assignors to Mobil Oil Corporation, a corporation of New York
No Drawing. Filed Dec. 30, 1963, Ser. No. 334,618
9 Claims. (Cl. 260—2.2)

This invention relates to ion exchange catalysts. It is more particularly concerned with porous silica-containing synthetic polymer ion exchange materials.

As is well known to those familiar with the art, synthetic ion exchange materials, such as sulfonated cross-linked polystyrene resins, are substantially non-porous (micro-porous) glass-like materials. Due to the lack of porosity, diffusivity is poor and many of the ionic sites or groups are not readily accessible. Particularly when such ion exchange materials are used as catalysts in acid- or base-catalyzed non-aqueous reactions (e.g., alkylation), resort must be had to relatively high temperatures and pressures to achieve sufficient catalytic activity. It has been proposed to prepare ion exchange materials by special procedures to increase porosity and to make active catalytic sites more readily available. Such catalysts display greater catalytic activity, i.e., they catalyze reactions at much lower temperatures and often at substantially atmospheric pressure. It is highly desirable, therefore, to effect greater porosity and diffusivity in synthetic polymer ion exchange materials.

It is the discovery of this invention that ion exchange materials having a high degree of porosity can be produced by a method that involves forming a polymer in and on a crystalline aluminosilicate and thereafter removing alumina. The silica remaining dispersed in the polymer imparts physical strength to it.

Accordingly, it is an object of this invention to provide porous synthetic polymer ion exchange materials. Another object is to provide a method for producing such materials. A specific object is to provide silica-containing porous synthetic polymer ion exchange materials. Other objects and advantages of this invention will become apparent to those skilled in the art, from the following detailed description.

This invention provides silica-containing, porous synthetic aromatic polymer ion exchange materials and a method for producing them that comprises forming a synthetic aromatic polymer in and on a crystalline aluminosilicate, leaching out at least part of the alumina content with strong acid, and introducing ionic groups into the polymer thus obtained.

In another embodiment, the aluminosilicate is also leached with strong caustic solution, in order to remove at least a part of the silica from the polymer.

The materials in and on which the synthetic polymer is formed, in accordance with this invention are crystalline aluminosilicates. These can be defined as three-dimensional aluminosilicates in which the rigid crystalline structure is not destroyed, collapsed, or substantially altered when essentially all the water of hydration is removed from the pores within the crystal lattice. The aluminosilicate can be naturally occurring or synthetic, or a combination of both. Natural occurring crystalline aluminosilicates usually contain sodium ions or calcium ions, or both. Typical natural aluminosilicates are natrolite, scolecite, analcite, thomsonite, heulandite, mordenite, stilbite, chabazite, gmelinite, levynite, and faujasite.

Synthetic aluminosilicates are usually prepared in the alkali metal form, usually the sodium form, or in the calcium form. Particularly desirable synthetic aluminosilicates are those which are known as "zeolitic molecular sieves." Zeolitic molecular sieves suitable for the purpose of this invention are synthetic aluminosilicates having substantially uniform pore diameter of between about 5 and 15 A.U. A typical synthetic zeolitic molecular sieve is type X molecular (about 13 A.U. pore size) which is available commercially. In United States Letters Patent No. 2,882,244, the type X sieve is fully described and characterized. Reference should be made to said patent for information on this type zeolitic molecular sieve. The formula for this sieve is:

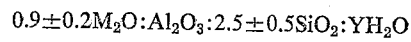

$$0.9 \pm 0.2 M_2O : Al_2O_3 : 2.5 \pm 0.5 SiO_2 : YH_2O$$

In this formula, M represents a metal, n its valence, and Y may be any value up to 8, depending on the metal and the degree of hydration of the crystal. Various other forms of zeolitic molecular sieves, such as type A and type Y, are well known to those familiar with the art.

In general, the polymer that is formed in and on a crystalline aluminosilicate, in accordance with this invention, is any polymer containing aromatic groups into which ionic groups can be introduced. Two types of polymers are utilizable, condensation polymers and vinyl polymers. One class of condensation polymer includes the well known base-catalyzed phenolic resins. The best known of this class is the condensation product of phenol and formaldehyde, but other phenols and aldehydes can be used. Typical phenols are phenol, cresols, xylenols, and p-alkylated ($C_4$–$C_8$) phenols. Aldehydes utilizable include formaldehyde, hexamethylenetetramine, furfural, benzaldehyde, and acetaldehyde.

Another condensation polymer contemplated herein is cracking coke. This is the final product of the condensation process in cracking and consists of highly polycyclic hydrocarbons poor in hydrogen. See Ellis', "The Chemistry of Petroleum Derivatives," vol. II, pages 145 and 146, Reinhold Publishing Co. (1937). Within the contemplation of this invention, a crystalline aluminosilicate (usually acid activated) is used as a catalyst or contact material in a cracking operation, until the pores of the aluminosilicate are filled with cracking coke. The amount of time required to produce sufficient coke buildup on the aluminosilicate depends upon a variety of factors, including temperature, pressure, cracking activity of the aluminosilicate, and nature of the charge stock. Generally, cracking is carried out at temperatures of between about 400° F. and about 1100° F. and at pressures between about atmospheric and about 100 p.s.i.g. Any petroleum charge stock known to the art can be used, but coking is greater with heavier stocks. Typical charge stocks are petroleum residual stocks, light and heavy gas oils, full range gas oils, and topped crudes.

The aromatic vinyl polymers contemplated herein are polymers and copolymers of vinyl aromatic compounds. Such polymers are used to make the well known ion exchange resins, by introduction of ionic groups therein. While homopolymers have been used, copolymers are preferred, notably copolymers derived by polymerizing a monovinyl aromatic monomer, such as styrene, with a divinyl cross-linking agent, such as divinylbenzene.

By way of non-limiting examples, suitable monomers include styrene, o-, m-, or p-methylstyrene, chlorostyrene, vinylnaphthalene, acenaphthylene, vinylthiophene, and sulfonated derivatives of the foregoing compounds. Non-limiting examples of cross-linking co-monomers, which need not be aromatic, include divinylbenzene, divinyltoluene, divinylnaphthalene, divinylxylene, diallylcarbonate, triallyl cyanurate, diallyl phthalate, butadiene, and isoprene. The amount of cross-linking co-monomer used can be between about 0.1 and about 70 mole percent.

The vinylaromatic polymers, including copolymers, are produced by polymerizing the monomers or comonomers in the presence of suitable catalysts. The polymerization can be carried out with free-radical reaction initiators, such as peroxides, e.g., benzoyl peroxide, t-butyl hydroperoxide, di(t-butyl) peroxide, cumyl peroxide, and the like, and other free-radical initiators disclosed in United States Letters Patent No. 2,957,931. The free radical initiator is particularly desired when the crystalline aluminosilicate is in the alkali or alkaline earth metal form. The vinylaromatic polymerization can be carried out, however, with acidic catalysts. Thus, when the crystalline aluminosilicate is in an acidic form, such as when it is acid treated, or exchanged, or it is activated by exchange with metals such as rare earth metals, the acidic aluminosilicate can be used alone as the polymerization catalyst.

Although not necessary, in order to ensure more even distribution of the monomer(s) in and on the crystalline aluminosilicate, it is desirable to introduce the monomer(s) in solution in a solvent. Suitable solvents are non-reactive with either the aluminosilicate or monomer or comonomer mix such as benzene, hexane, cyclopentane, dioxane, etc. The amount of solvent can vary widely, but in general, it is preferred to use at least 50 volumes solvent per 100 volumes monomer or comonomer mix. In general, the vinyl polymerization is carried out at temperatures of between about 20° C. and about 500° C. for periods of time varying between about 0.25 and about 10 hours.

In accordance with this invention, after the aromatic polymer has been formed in and on a crystalline aluminosilicate, at least a portion of the alumina content of the aluminosilicate (and including any cation present therein) is removed by leaching with strong mineral acids, such as hydrochloric acid, sulfuric acid, nitric acid, mixtures of nitric and sulfuric acids, and phosphoric acid. At least a part of the alumina may be removed by chelation with such chelating agents as acetylacetone and ethylenediamine tetraacetate. In general, the leaching treatment can be carried out at between about 20° C. and about 200° C., for times of between about 15 minutes and about 10 hours. The higher temperatures and longer leaching times will usually be needed, when the leaching acid is dilute rather than concentrated.

When all or a portion of the alumina is removed, the remaining product contains silica, which imparts to the final product surface area and physical rigidity or strength. In one aspect of this invention, however, silica can also be removed from the polymer. This is effected by leaching with strong aqueous caustic solutions. Such solutions should contain at least 5 to 50% caustic. Generally, caustic leaching is carried out at 20–200° C. for 15 minutes to 10 hours; the more severe conditions being used with more dilute caustic solutions.

After the leaching operation to remove alumina or both alumina and silica, at least in part, the ionic group is introduced into the aromatic polymer, if not already present in the polymer. In some cases the vinylaromatic monomer will have contained an ionic group, such as sulfonic acid, hydroxyl, amino, etc. In general, cation exchange groups are nuclear sulfonic, methylene sulfonic, carboxylic acid, phosphonic acid, and phenolic groups. Synthesis of these types have been described in both the patent and technical literature. In general, the anion exchange groups are nuclear amino, alkylamino, and quaternary ammonium groups. Amino groups can be present as a substituent on the vinylaromatic monomer. It can also be introduced by nitration of the aromatic rings of the polymer, followed by reduction to the amino groups. Quaternary ammonium groups are introduced by haloalkylating the aromatic rings, reacting with a tertiary amine, and water washing to produce a quaternary ammonium hydroxide (see U.S. Patents 2,591,573 and 2,591,574).

In the particular case in which cationic sulfonic acid group is to be introduced, this can be effected concomitant with leaching out the alumina. Fuming sulfuric acid is used as the leaching acid, as described hereinbefore. Thus, in one step, alumina is removed and the aromatic nuclei are sulfonated, producing a silica-containing sulfonated porous aromatic polymer.

The following examples illustrate the present invention using a vinylaromatic polymer. The rare earth acid X aluminosilicate was prepared from Linde 13–X molecular sieve, which is a sodium X aluminosilicate described in U.S. Patent 2,882,244. It was exchanged with aqueous rare-earth chloride solution (containing 4% of $RECl_3 \cdot 6H_2O$) at 180–200° F. to remove sodium from the sieve and replace it with the chemical equivalent of rare earth element. The sieve was washed free of soluble salts, dried at 250–300° F. and calcined for 4.4 hours at 1250° F. and 15 p.s.i.g. in 100% steam. The RE–X aluminosilicate thus produced contained about 1.0% sodium and about 25% wt. rare-earth element, calculated as $RE_2O_3$.

EXAMPLE I (1) *Monomer adsorption and polymerization*

Fifty grams of rare earth acid X aluminosilicate powder (>200 mesh) was charged to a 1-liter round bottom flask, equipped with a motor-driven stirrer, thermometer, and water condenser. Three grams of a solution consisting 8 wt. percent divinyl benzene in styrene was added. At the point of contact with the catalyst powder the temperature rose immediately to 155° C., and the catalyst at that point turned brown, indicating rapid adsorption and polymerization of the monomer mix. To ensure slower adsorption and more even distribution of the monomer mix over the catalyst before polymerization, 100 cc. benzene was added to the catalyst, completely "wetting" it. To this stirred mixture was then added over a 10-minute period a total of 43 g. of the divinyl benzene-styrene solution, the temperature not exceeding 35° C. The contents of the flask were then heated to 45° C. and held there for ½ hour. The benzene solvent was then topped off at a reduced pressure of 140 mm. temperature 20–25° C. The residue (a brown, friable powder) weighed 70 g. To complete the polymerization, the residue powder was placed in a 110° C. oven for 66 hours.

(2) *Removal of alumina and rare earth by HCl extraction*

One part by weight of the product from (1) was extracted with a total of 10 parts by weight of HCl (as 37 wt. percent HCl in water) in three steps, each step consisting of heating the materials together at 105° C. for 15 minutes with stirring, then cooling and filtering off the extract through filter paper. The filter cake, after water-washing to remove HCl, contained (on a water-free basis) 32.4 wt. percent carbon, 2.4 wt. percent hydrogen, 65.2 wt. percent silica, and nil rare earth and alumina (a portion of this was further treated with 50% KOH solution, reducing silica to 0.2 wt. percent; the surface area of hydrocarbon resin left was 6 m.$^2$/g.).

(3) *Sulfonation of silica-containing resin*

A portion of the product from (2), 1 part by weight, was treated with 10 parts by weight of 98% sulfuric acid in a stirred flask, heated to 100° C. for 15 minutes, cooled, and filtered through paper. The filter cake, after water-washing to remove unreacted sulfuric acid and drying in air, had the analyses given in Table I, and when placed in contact with a neutral aqueous NaCl solution, gradually acidified the solution as measured by litmus paper (resin-SO$_3$H+NaCl→resin-SO$_3$NA+HCl).

EXAMPLE II (1) *Monomer adsorption and polymerization*

One hundred grams of the rare earth acid X aluminosilicate was stirred together in the 1 liter flask with 100 g. petroleum ether, and to this slurry was added 20 g. of the 8% divinyl benzene in styrene solution, the temperature rising from 23° C. to 34° C. The contents were then heated to 45° C. and held there for ½ hour. The petroleum ether solvent was then topped off at a reduced pressure of 140 mm. at 20–25° C., and the remaining material placed in a 50° C. oven for 168 hours to complete the polymerization—final weight 126 grams.

(2) *Removal of alumina and rare earth by HCl extraction*

One part by weight of the product from (1) was extracted with a total of 2 parts by weight of HCl (as 37 wt. percent HCl in water) in two steps, each step consisting of heating the materials together at 50–70° C. for ½ hour with stirring, then cooling and filtering off the extract through paper. The filter cake, after water-washing to remove HCl, contained (on a water-free basis) 28.0 wt. percent carbon, 2.5 wt. percent hydrogen, 69.3 wt. percent silica, 0.2 wt. percent alumina, and 0.2 wt. percent rare earths.

(3) *Sulfonation of silica-containing resin*

One part by weight of the product from (2) was treated with 2.4 parts by weight of fuming sulfuric acid (15–18% SO$_3$) in a stirred flask, heated to 100° C. for ½ hour, cooled and filtered through paper. The filter cake, after water-washing to remove unreacted sulfuric acid and drying in air, had the analyses given in Table I. It exchanged with sodium ion in the aqueous NaCl solution test.

In the preceding examples, the aluminosilicate acted as a catalyst as well as a form. The following example illustrates the use of a less catalytically active aluminosilicate, which requires added catalyst.

EXAMPLE III (1) *Monomer adsorption and polymerization*

The same procedure was used as in Example II except sodium X aluminosilicate was used and one wt. percent benzoyl peroxide was added to the 8% divinyl benzene in styrene solution to catalyze polymerization (NaX is a less active polymerization catalyst than rare earth X) and cyclopentane was used instead of petroleum ether. Final weight 126 grams.

(2) *Removal of alumina and sodium by HCl extraction*

The procedure was the same as in Example II. The filter cake, after water-washing to remove HCl and drying in the air, contained (on a water free basis) 18.2 wt. percent carbon, 1.3 wt. percent hydrogen, 79.7 wt. percent silica, 0.5 wt. percent alumina, and 0.3 wt. percent sodium.

(3) *Sulfonation of silica-containing resin*

One part by weight of the product from (2) was treated with 1.6 parts by weight of fuming sulfuric acid as in Example II. The filter cake, after water-washing and drying in air, had the analysis given in Table I, and exchanged with sodium ion in the aqueous NaCl solution test.

The following example demonstrates the embodiment of this invention wherein the aromatic polymer is cracking coke. It also illustrates simultaneous alumina removal and sulfonation.

EXAMPLE IV (1) *Cracking to produce coke on catalyst*

A total of 98 grams of REHX (dry powder, >200 mesh) was stirred together with 990 grams of petroleum residual stock (initial boiling point 540° C., 1.6 wt. percent sulfur and 0.43 wt. percent nitrogen—typical commercial coker charge) at an average temperature of 380° C. for 28 hours. A total of 415 grams of the stock cracked and distilled out of the flask during this time. The 673 grams of bottoms was stirred with 1100 cc. of benzene at 76° C. (refluxing) for 3 hours, cooled, and filtered through paper. The dried residue (black, friable powder) weighed 150 g. and contained 33.5 wt. percent carbon, 2.6 wt. percent hydrogen, 0.9 wt. percent sulfur, 0.7 wt. percent nitrogen, 15.0 wt. percent rare earth oxides, 19.5 wt. percent alumina, and 23.8 wt. percent silica.

(2) *Combination extraction-sulfonation*

One part by weight of the product from (1) was treated with 3.6 parts by weight of fuming sulfuric acid as in Example II. The filter cake, after water-washing and drying in air, had the analysis given in Table I, and exchanged with sodium ions in the aqueous NaCl solution test.

EXAMPLE V

The catalysts of Examples II, III and IV were each used to crack cyclopropane under a standardized set of conditions. In each run cyclopropane was passed through a bed containing 50% catalyst under test (>200-mesh size) and 50% quartz (18–25 mesh), at a liquid hourly space velocity, based on test catalyst, of 1.7. The bed was maintained at 250° F. and each run lasted 90 minutes. Periodically, the degree of conversion (into propane and propyl- TABLE I.—PREPARATION OF CATION EXCHANGE RESIN CATALYSTS UTILIZING CRYSTALLINE ALUMINOSILICATES

| Example | 1 | 2 | 3 | 4 |
| --- | --- | --- | --- | --- |
| Aluminosilicate | REHX | REHX | NaX | REHX |
| Hydrocarbon Charge | 8 Percent Divinyl Benzene in Styrene [1] | | | Petroleum Residual Stk |
| Process | Polymerization | | | Liquid Phase Cracking |
| HCl Extracted | Yes | Yes | Yes | No |
| Sulfonated Catalyst Carbon, wt. percent | 6.1 | 7.8 | 2.9 | 36.9 |
| Total Sulfur, wt. percent | 0.95 | 1.57 | 0.64 | 5.73 |
| Sulfonic Acid Sulfur, wt. percent | 0.95 | 1.57 | 0.64 | 5.00 |
| Atomic Ratio, C/S | 17 | 13 | 12 | 19 |
| Hydrogen, wt. percent | 0.16 | 0.04 | 0.09 | |
| Silica, wt. percent | 80.2 | 71.6 | 81.6 | 27.0 |
| Alumina, wt. percent | Nil | <0.2 | <0.5 | 4.0 |
| Rare Earth Oxides, wt. percent | Nil | <0.2 | | 3.6 |
| Sodium, wt. percent | | | <0.3 | |
| Water, wt. percent (By Diff.) | 12.6 | 19.0 | 14.8 | 22.8 |
| Surface Area, m.²/g | 310 | 385 | 710 | 14 |

[1] 1 wt. percent benzoyl peroxide added to monomer mix in Example 3.

ene) was determined by gas chromatography of the effluent stream. Pertinent results are shown in Table II.

TABLE II

| Catalyst of— | Percent Conversion | | |
|---|---|---|---|
| | Example 2 | Example 3 | Example 4 |
| 2 min | 15 | 1.8 | 1.4 |
| 10 min | 6 | 1.1 | 1.3 |
| 25 min | 4 | 0.8 | 1.1 |
| 30 min | | | |
| 35 min | 4 | 0.7 | 1.1 |
| 40 min | | | |
| 50 min | 3 | | |
| 55 min | | 0.7 | |
| 60 min | | | |
| 70 min | 3 | 0.6 | |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing an ion exchange resin that comprises forming a synthetic aromatic polymer selected from the group consisting of phenolic-aldehyde resins, cracking coke, and cross-linked vinyl aromatic polymers in and on a three-dimensional crystalline aluminosilicate, leaching out at least a part of the alumina content with strong mineral acid, and introducing ionic groups into the polymer.

2. The method defined in claim 1, wherein said aromatic polymer is a cross-linked vinyl aromatic polymer.

3. The method defined in claim 2, wherein said alumino-silicate is a synthetic three-dimensional crystalline aluminosilicate.

4. The method defined in claim 1, wherein said polymer is a phenolic-aldehyde resin.

5. The method defined in claim 1, wherein said alumino-silicate is a three-dimensional zeolitic molecular sieve.

6. An ion exchange resin produced by the process of claim 1.

7. A method for producing an ion exchange resin that comprises forming a copolymer of styrene and divinylbenzene in and on a three-dimensional zeolitic molecular sieve, leaching out at least a part of the alumina content with strong mineral acid, and introducing ionic groups into the polymer.

8. A method for producing an ion exchange resin that comprises forming a copolymer of styrene and divinyl benzene in and on a three-dimensional zeolitic molecular sieve, leaching out at least a part of the alumina content with hydrochloric acid, and introducing sulfo groups into the polymer.

9. A method for producing an ion exchange resin that comprises forming cracking coke in and on a three-dimensional zeolitic molecular sieve, leaching out at least a part of the alumina content with sulfuric acid, and introducing sulfo groups into the cracking coke.

References Cited

UNITED STATES PATENTS

| | | | |
|---|---|---|---|
| 2,882,244 | 4/1959 | Milton | 252—455 |
| 2,999,821 | 9/1961 | Fisher | 260—2.1 |
| 3,037,052 | 5/1962 | Bortnick | 260—2.2 |
| 3,062,760 | 11/1962 | Dermody et al. | 260—2.5 |
| 3,088,924 | 5/1963 | Ranjan et al. | 260—2.1 |

WILLIAM H. SHORT, *Primary Examiner.*

JOSEPH L. SCHOFER, *Examiner.*

M. GOLDSTEIN, C. A. WENDEL, *Assistant Examiners.*